(12) United States Patent
Kochhar et al.

(10) Patent No.: US 12,346,853 B2
(45) Date of Patent: Jul. 1, 2025

(54) REMOTE WORKING EXPERIENCE OPTIMIZATION SYSTEMS

(71) Applicant: Omnissa, LLC, Mountain View, CA (US)

(72) Inventors: Arjun Kochhar, Bangalore (IN); Ramani Panchapakesan, Bangalore (IN); Pavan Rajkumar Rangain, Bangalore (IN); Rohit Pradeep Shetty, Bangalore (IN)

(73) Assignee: Omnissa, LLC, Mountain View, CA (US)

(*) Notice: Subject to any disclaimer, the term of this patent is extended or adjusted under 35 U.S.C. 154(b) by 509 days.

(21) Appl. No.: 17/468,689

(22) Filed: Sep. 8, 2021

(65) Prior Publication Data

US 2023/0026409 A1  Jan. 26, 2023

(30) Foreign Application Priority Data

Jul. 22, 2021 (IN) .............................. 202141033001

(51) Int. Cl.

| | |
|---|---|
| *G06Q 10/06* | (2023.01) |
| *G06Q 10/0631* | (2023.01) |
| *G06Q 10/10* | (2023.01) |
| *G06Q 10/107* | (2023.01) |
| *H04L 29/08* | (2006.01) |
| *H04L 67/5683* | (2022.01) |

(52) U.S. Cl.
CPC ............... *G06Q 10/063114* (2013.01); *G06Q 10/06314* (2013.01); *G06Q 10/107* (2013.01); *H04L 67/5683* (2022.05)

(58) Field of Classification Search
None
See application file for complete search history.

(56) References Cited

U.S. PATENT DOCUMENTS

| | | | |
|---|---|---|---|
| 10,204,175 B2* | 2/2019 | Hu .................... G06F 16/9024 |
| 2007/0055660 A1* | 3/2007 | Anderson .............. H04L 67/62 |
| 2019/0228495 A1* | 7/2019 | Tremblay ............... G06N 3/045 |
| 2020/0160208 A1* | 5/2020 | Tan .................. G05B 19/41855 |
| 2020/0272978 A1* | 8/2020 | Flores ............ G06Q 10/063114 |
| 2021/0266225 A1* | 8/2021 | Kozhaya ............... H04L 41/147 |

* cited by examiner

*Primary Examiner* — Eric W Stamber
(74) *Attorney, Agent, or Firm* — Kim & Stewart LLP (57) ABSTRACT

Disclosed are various approaches for remote working experience optimization. In some examples, a management service receives task execution data and corresponding user data for multiple client devices. The management service inputs target user context data along with the task execution data and the corresponding user data into a prediction model to identify a task and a task schedule that indicates a time to download and cache task content. Instructions are transmitted for a management agent to download and cache the task content according to the task schedule.

14 Claims, 4 Drawing Sheets

REMOTE WORKING EXPERIENCE OPTIMIZATION SYSTEMS

RELATED APPLICATION

Benefit is claimed under 35 U.S.C. 119(a)-(d) to Foreign Application Serial No. 202141033001 filed in India entitled "REMOTE WORKING EXPERIENCE OPTIMIZATION SYSTEMS", on Jul. 22, 2021, by VMware, Inc., which is herein incorporated in its entirety by reference for all purposes.

BACKGROUND

Working from home is becoming a more prevalent mode of operation for enterprises of all sizes. However, enterprise resources are often more easily accessible from the on-premises workplace. For example, the enterprise workplace can include on-premises servers and data stores that include enterprise resources. The enterprise workplace can also have a high-throughput connection to the Internet, enabling fast downloads. Enterprise workloads can include long running and high traffic requirements. There can be a significant slowdown in productivity when connecting using a home network connection. Enterprises may desire to maintain the same level of productivity and the same set of tasks, while allowing users to work from home.

However, existing technologies can either require users to forego some long-running and high traffic enterprise tasks. Other scenarios can maintain the requirements with the understanding that performance will be lower than on-premises productivity. This inefficiency can cause enterprises issues with onboarding new employees as well as maintaining productivity for their employees and clients. As a result, there is a need to optimize the remote working experience.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to work experience optimization systems. Enterprise tasks can face issues when connecting to a network through home network connections, satellite office network connections, as well as in other remote working and off-premises working scenarios. Enterprises may desire to maintain the same level of productivity and the same set of tasks, while allowing users to work from home. Existing technologies can either require users to forego some long-running and high traffic enterprise tasks. Other scenarios can maintain the requirements with the understanding that performance will be lower than on-premises productivity. This inefficiency can cause enterprises issues with onboarding new employees as well as maintaining productivity for their employees and clients. However, the present disclosure describes mechanisms for work experience optimization that can increase efficiency for off-premises scenarios as well as any low network throughput or low network quality scenarios whether on-premises or off-premises.

In various scenarios, employees and other users of an enterprise can download escalation logs, download videos, clone stash repositories, and access other task content and data to perform enterprise tasks. Some tasks can include watching the videos or executing long running tasks like deploying containerized clusters, performance test beds, and other instructions. However, when working from home or another off-premises location, network quality can be relatively low compared to on-premises network quality. As a result, power and network problems such as disconnects, slowdowns, power surges and outages, and other issues can cause users to re-run these tasks.

Employees today run tasks on their respective client devices, but can do so at different times based on time zone, location, and user habit. A client management agent deployed on each client device that can monitor the device for which tasks are executed and can measure the time taken to complete the tasks. This information can be reported to an enterprise such as a management service or another enterprise management service. Along with this information, the client management agent can also report the time at which these tasks were run, the configuration of device on which it was run, and an order in which the tasks were run. The client management agent can also collate the average download speed when these tasks were run. These tasks can be combined with other enterprise tools to map the actions to a team level, business level, or another group level.

The management agent can have access to tools and data provided by network services. The client management agent can fetch escalation tickets assigned to the user through the network service and can download attachments so they are readily available for the user when they want to access it. For example, the escalation can be raised during EST hours and the employee is based out of IST time. In this case, during the night time of the user, the management agent can fetch and keep all the information cached locally to a client device or an edge device so the user can directly start reviewing the logs without having to spend time to download them first. All of this user context information and task execution information can be provided as inputs to a machine learning model that can learn over a period of time and provide a prediction on the most likely, high-priority, or long-running tasks, as well as an order and timing to download task content, and an order and timing to initiate tasks in order to optimize the off-premises work experience.

For example, if a user tries to perform a task that has already been performed by multiple users before, the model can provide the user with a recommendation on when to run the task and what secondary tasks should to be run as well (and in a specific order) to get a cohesive experience. This way users can decide on when to run these events instead of having to wait for these tasks to complete in conditions which aren't optimized. Since the user can be mapped to a group such as a team or business unit, for example, through tools like Workday or Active Directory, the tasks proposed can be identified based on inputs that include the team/BU that the user (and other users) belong to. As a result, even new members or members in training can get effective suggested tasks.

Additionally, when users run these tasks in an optimized fashion, the management agent can notify the user's primary mobile device when the tasks complete on their productivity or desktop device. This way the user can be notified when the task gets completed, thus acting as a great productivity booster in scenarios when employees are working from home most of their time.

In other scenarios, there are several common videos watched across an organization. As an example, employees can watch recording of town halls, meetings, training recordings and so on, frequently. This could potentially hit a server with a huge load when all employees stream at the same time. However, the mechanisms described herein can include generation of a task content preload schedule that indicates a time for a client device, or an SD-WAN enabled edge device, to pre-cache this task content. Since the preload schedules that have been generated are known, the system can select download timing to prevent resource contention and network slowdowns. This can improve employee productivity as well as reduce the load on remote servers.

The mechanisms described can optimize employee work experience while working from home by providing users with a predictive set of tasks, a timing and order in which the predictive tasks should be run for optimal experience. An employee can also be provided with a timing and order for a user-selected task. The user-selected task can be provided as user context data input to the machine learning model. Supplemental task order and timing can also be identified for a predicted primary task or a user-selected task. Notifications can be provided when task content downloads are initiated, when task content downloads are completed, when a task is initiated, and when a task is completed, thus preventing unnecessary user screen time. Enterprise content and network service data can be preloaded to increase access time from the perspective of the user when working off-premises.

Figure 1:
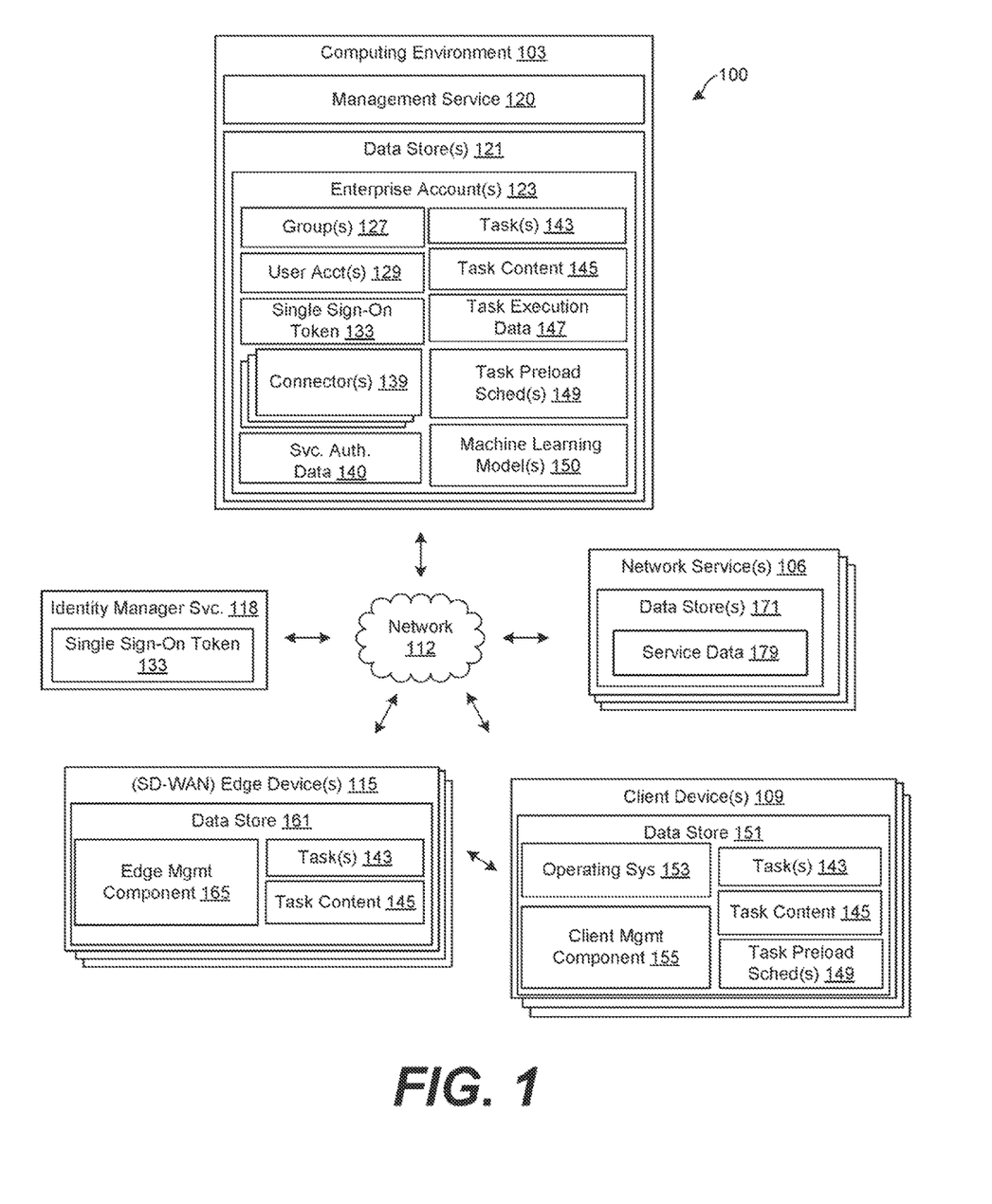
FIG. 1 is a drawing of an example of a networked environment, including client devices, network services, an identity manager service, a management service, and other components in communication through a network to provide remote working experience optimization.

Now moving to the figures, with reference to FIG. 1, shown is an example of a networked environment 100. The networked environment 100 can include a computing environment 103 executing a management service 120, identity manager service 118, edge devices 115, network services 106, and client devices 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the management service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a management service 120 as well as other applications, services, processes, systems, engines, or functionality not discussed in detail herein. The management service 120 can be stored in the data store 121 of the computing environment 103.

The management service 120 can be utilized by one or more enterprises. In some embodiments, the management service can be part of a local network, trusted network, or intranet, which can be separate from the other components of the networked environment 103. In some cases, the identity manager service 118 can be part of the computing environment 103. In other cases, the identity manager service 118 can be separate from the computing environment 103.

The management service 120 can manage enterprise workflows performed by users of the client devices 109. The management service 120 can also manage authentication with network services 106 that are utilized as backend services for the workflows. The management service 120 can monitor one or more network services 106 that a user is authorized to access. For example, the management service 120 can periodically query a network service 106 for notifications, updates, messages, changes, tasks to be performed, or other events. If a notification, update, message, change, task to be performed, or other event is identified, the management service 120 can then notify the user. For example, the management service 120 can send a message to the client device 109 to notify the user. The operating system 153 of the client device 109 can include a notification framework that provides a notification for the message using the client device 109. The notification can include a sound generated using an audio device, a visual notification using a display device, and haptic feedback using a haptic device.

The management service 120 can include authentication functionality, which can include retrieving, caching, or storing service authentication data 140 provided by various network services 106. The service authentication data 140 can be used to query the network services 106 for information. In some embodiments, use of the management service 120 can be invisible to the user. In other embodiments, the user may be asked to opt-in to the use of authentication services of the management service 120 or the identity manager service 118 through a web-portal or other user interface. Such a web-portal or other user interface can be provided, for example, by the management service 120 or the identity manager service 118.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include memory of the computing environment 103, mass storage resources of the computing environment 103, or any other storage resources on which data can be stored by the computing environment 103. The data stored in the data store 121 can include, for example, a number of enterprise accounts 123, each of which can be associated with user accounts 129, service authentication data 140, single sign-on tokens 133, connectors 139, tasks 143, task content 145, task execution data 147, task preload schedules 149, machine learning models 150, and other data. The user accounts 129 can be associated with specific subsets of the service authentication data 140, single sign-on tokens 133, tasks 143, the task execution data 147, the task preload schedules 149, and the connectors 139.

While shown within the computing environment 103, connectors 139 can include local and external connectors. External connectors 139 can be hosted in a cloud or another network resource. The data stored in the data store 121 can be associated with the operation of the various applications and/or functional entities described. A user account 129 includes information associated with a user. The information can include one or more authentication credentials, such as the single sign-on tokens 133, as well as stored or cached access tokens, refresh tokens, and service credentials. Other information about the user can also be stored as part of the user account 129, such as the user's name, email address, contact information, enterprise responsibilities, and client devices 109. The responsibilities can include responsibilities to perform particular tasks 143 or types of tasks 143 for the enterprise.

A user account 129 can also include access permissions that indicate computing resources that the user account is authorized to access. For example, the access permissions can indicate that a user account 129 is permitted to access some network services 106 but is prohibited from accessing other network services 106. As another example, the access permissions can indicate that the user account 129 is allowed to access certain features of a network service 106, but prohibited from accessing other features. For example, if one of the network services 106 that a user was permitted to access was a customer relationship management (CRM) service, the user might have permission to access his or her own contacts but be prohibited from accessing the sales contacts of other users.

The user account 129 can identify device data for associated client devices 109. Device data can include one or more of a device identifier, a unique device identifier (UDID), a media access control (MAC) address, an internet protocol (IP) address, or another identifier that uniquely identifies a device with respect to other devices. The device data can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for a hardware device and a peripheral of the client device 109, an operating system or operating system version installed on the client device 109, and other information. The user account 129 can also include an organizational group of the user account 129 or the client device 109.

The single sign-on (SSO) token 133 is a software token generated by the identity manager service 118 in response to a successful authentication of the user with the identity manager service 118 using authentication credentials for the identity manager. The identity manager credentials can be user- or account-specific. The identity manager credentials can represent the credentials that a user can present to the identity manager service 118 to authenticate the user's identity. Identity manager credentials can include a combination of a username and password, a cryptographic certificate, a one-time password, or a combination of several of the credentials as part of a multi-factor authentication schema. Examples of one-time passwords can include a one-time password generated using a version of the time-based one-time password algorithm (TOTP) or a one-time password generated using the HMAC-based one-time password (HOTP) algorithm.

The SSO token 133 can be used to provide the client device 109 access to various network services 106 on behalf of the authenticated user. The SSO token 133 can include a character string or other data. In some cases, the SSO token 133 can be provided in a request, a command, a response, a URL, a file, or another structure, and can be in XML format, JSON format, or another format. In some instances, such as those implementing a version of the KERBEROS protocol, a separate SSO token 133 can be generated for each network service 106 that the client device 109 attempts to access on behalf of the user. In other instances, the single SSO token 133 can be generated and used to provide the client device 109 with access to several of the network services 106. Although each of the network services 106 can have a different set of authentication credentials linked to the user account 129, such as a different username and password combination, the SSO token 133 allows the user to authenticate once with the identity manager service 118 in order to use each of the network services 106 instead of having to authenticate with each of the network services 106 separately.

The identity manager service 118 can authenticate users and manage user authorizations or permissions to access network services 106, applications, data, or other computing resources. For example, the identity manager service 118 could correspond to a single sign-on portal that verifies a user's authentication credentials, issues a single sign-on token 133 that identifies the user, and verifies whether the user has the appropriate access permissions to access one or more network services 106. Examples of identity manager services 118 include AMAZON's AWS Identity and Access Management (IAM) service, VMWARE's Identity Manager, or MICROSOFT's Active Directory Federation Services.

A network service 106 can be a web application, web service, or another network facing application. The network service 106 can be federated or associated with a shared identity manager service 118 so each can be accessed using the identity manager service 118. One or more network services 106 can be provided by the same provider or by different providers. The network service 106 can receive a service request and provide service data 179 based on the service request. The management service 120 can generate the service request or receive the service request from a client device 109. The management service 120 can use a connector 139 to provide the service request to the network service 106. The network service 106 can provide service data 179 in response to the service request. The network service 106 can transmit the service data 179 directly to the client device 109, or the service data 179 can be relayed to the client device 109 through the management service 120.

The service authentication data 140 can include information that guides authentication with network services 106. For example, API keys, access tokens, refresh tokens, service credentials, cryptographic certificates, and other credentials. The service authentication data 140 can also include network endpoints or addresses associated with particular functionalities provided by a network service 106. Service authentication data 140 can also include a process or a number of navigation tasks or other tasks that are required for the management service 120 to perform authentication with a network service 106 on behalf of a user.

The API key can be a token provided by one of the network services 106 in response to a successful authentication with the network service 106. The API key represents that a user account 129 is currently authorized to access or otherwise interact with the network service 106. The API key can include a character string, code, or other data. The API key can be provided to a network service 106 for authentication. For example, the API key can be provided in an HTTP header, a URL query string parameter, a request body field, or another structure.

The access token can be a token provided by one of the network services 106 in response to a successful authentication with the network service 106. The access token represents that a user account 129 is currently authorized to access or otherwise interact with the network service 106. The access token can include a character string, code, or other data. The access token can be provided to a network service 106 for authentication. For example, the access token can be provided in an HTTP header, a URL query string parameter, a request body field, or another structure. For security purposes, the access token can have a time-limit associated with it, such as 1 hour, 3 hours, 6 hours, 8 hours, or some other period of time. Once the time-limit has expired, the access token can no longer be used to prove current authentication status of the user account 129 with the network service 106. The access token can be provided, for example, as part of an authentication exchange using a version of Open Authorization (OAUTH) protocol.

The refresh token can be a token provided by one of the network services 106 in response to a successful authentication with the network service 106. The refresh token can be used to acquire a new access token once a current or previous access token expires. The refresh token often has a much longer time-limit associated with it, such as 1 day, 1 week, 30 days, 3 months, or 1 year, which allows for the refresh token to be used to acquire a series of access tokens after an initial successful authentication. In the event that a user's access is revoked, the refresh token can be marked invalid, preventing the refresh token from being used to acquire new access tokens. The refresh token can be provided, for example, as part of an authentication exchange using a version of the OAUTH protocol.

The management service 120 can submit an authentication request to the network service 106. Once authenticated, the network service 106 can provide credentials and other service authentication data 140 to the management service 120. The management service 120 can store or cache the service authentication data 140 to use on behalf of a user. If the service authentication data 140 expires, or the management service 120 determines that an authentication using the service authentication data 140 is unsuccessful, the management service 120 can attempt to obtain new credentials or new service authentication data 140. For example, the management service 120 can automatically obtain a new access token for the user when the current access token expires or is about to expire. For example, the management service 120 can determine that the access token was obtained 59 minutes ago, but is only valid for one hour. As another example, the management service 120 can determine that the access token was obtained 61 minutes ago, but the access token was only valid for one hour. In response to either example, the management service 120 can submit a second authentication request to the network service 106. The second authentication request can include the refresh token.

The service credentials can include a password, a token, a certificate, or another form of credentials. The service credentials can be generated according to a security standard. The service credentials can be associated with a particular network service 106, or a particular function provided by the network service 106. Service credentials can be considered a multi-user password, as multiple users or user accounts 129 can utilize the same service credentials to access the network service 106. The service credentials can also be group-wide credentials for use by a group of users, or enterprise-wide credentials for use by an entire enterprise. Group credentials, enterprise-wide credentials, or other multi-user credentials can also include a username and password, a cryptographic certificate, a character string, a one-time password, or a combination of several credentials as part of a multi-factor authentication scheme.

The tasks 143 can include workflow tasks or workflow actions that can be part of an enterprise workflow. For example, tasks 143 can include; playing a video for training, onboarding, or another purpose; executing a machine learning process, a data transfer process, or another long-running automated executable process or application that includes one or more of computations data transfer; scheduling a meeting, sending a product order; sending a message; adding a calendar item; requesting use or delivery of a client device 109, and other workflow tasks. Tasks 143 can specify user account permissions, or a list of user account(s) 129 that are authorized to perform the particular task 143. In addition, enterprise accounts 123 can include a list of tasks 143 that the enterprise has permissions or authorization to perform. Other tasks 143 can be performed by any user account 129. The tasks 143 can also include a trigger condition that the management service 120 can identify in order to determine the tasks 143 should be performed.

Tasks 143 can be associated with flags or indications of one or more task context data identified by the management service 120. The management service 120 can analyze messages including emails, short message service (SMS) text messages, messenger service messages, and other enterprise messages to identify tasks 143 and task context data. Tasks 143 can also be user defined and assigned through a console user interface of the management service 120. The task context data can indicate a category of the task, such as a video task, a document task, a process execution task, and other categories. The task context data can indicate a network location such as an Internet Protocol (IP) address or uniform resource link (URL), a portion of a URL, a portion or subnet of an IP address. The task context data can also indicate an assignor user account 129 associated with transmitting a message or otherwise assigning a particular task 143 to one or more assignee user accounts 129.

For example, a video training task 143 can be assigned to a group 127 of users by a particular user associated with a user account 129. The task 143 can be assigned by email or another message, or through a console user interface of the management service 120. The task source can include a URL through which a video and other task content 145 can be accessed. The management service 120 can identify the source URL that is entered through the console user interface, or the management service 120 can parse the message to identify the source URL. The management service 120 can also identify an assignor user account 129 and assignee user accounts 129. The management service 120 can identify an assignor user account 129 as the user logged into the console user interface. The management service 120 can identify an assignor user account 129 based on the user account 129 associated with an email address or message source identifier that sends the message. The management service 120 can identify an assignee user account 129 as identified through the console user interface, or based on the user accounts 129 associated with recipient identifiers of the email or another message.

The task content 145 can include video files, document files, audio files, applications, datasets, operating system updates, application updates, and other data that is utilized for a particular task 143. The task content 145 can include enterprise data stored in the data store 121 in association with the enterprise accounts 123, as well as service data 179 stored in the data store 171 and accessed using a network service 106. The task content 145 comprising enterprise data can be downloaded from the management service 120.

The task execution data 147 can include an identification of the tasks 143 performed by client devices 109, as well as execution context of each task 143. The client management component 155 can monitor the client device 109 and transmit the task execution data 147 to the management service 120. The task execution data 147 can indicate whether a particular task 143 is executed off-premises environment or on-premises. In some cases, the type of off-premises environment can be indicated. Types of off-premises environments can include a home, a public location, a shared office space, a temporary office space, a satellite office, or another type of off-premises environment. The task execution data 147 can indicate a geolocation for each task 143. This can be used to predict throughput for similarly client devices 109 that perform enterprise tasks 143.

The task execution data 147 can indicate a time when the task 143 is executed including a start time and an end time and a duration for task execution. The task execution data 147 can indicate a time when task content 145 is downloaded, including a start time and an end time and a duration to download the task content 145. The task execution data 147 can indicate a measure of network quality as well as network bandwidth and actual network throughput. The network quality can be reported for task execution and task content 145 downloads. The task execution data 147 can specify an enterprise role such as a position or title within the enterprise as well as a group 127.

A group 127 can include an enterprise or organizational group, subgroup, and so on. The group 127 can include any logical grouping of user accounts 129 and/or associated client devices 109. A group 127 can correspond to a department and a subgroup can correspond to a title, job, or other role within the group 127. A first group 127 can correspond to a development department while a second group 127 can correspond to a testing department in an enterprise. A subgroup can include programmers, and another subgroup or role that can include programming team lead, and so on. A single user account 129 can include multiple groups 127, subgroups, and roles.

The task execution data 147 can specify a configuration of an operating system 153, including an operating system type, version, and settings. A hardware configuration of the client device 109 can also be specified. The task execution data 147 can specify an edge device 115 through which the client device 109 connects to the network 112, as well as an indication of whether the edge device 115 is a software defined wireless area network (SD-WAN) enabled edge device 115.

The management service 120 can use parameters specified in the task execution data 147 as a set of inputs for one or more machine learning models 150. The management service 120 can also input user context data for a target user or user account 129. The management service 120 can store user context data in association with each user account 129. The user context data can indicate a configuration of an operating system 153 of a client device 109 associated with the account. The operating system configuration can include an operating system type, version, and settings. The user context data can indicate a geolocation of the client device 109 and a measure of network quality as well as network bandwidth and actual network throughput for the client device 109. The user context data can indicate whether the associated client device 109 is generally located in an off-premises environment or on-premises for enterprise-related tasks 143. In some cases, the type of off-premises environment can be indicated. The user context data can also indicate a group 127, subgroup, and a group-related role, such as a position or title with the enterprise. The user context data can also include information identified by the management service 120 from analysis of enterprise communications through a task application, email application, or messenger application.

A machine learning model 150 can output an identification of one or more tasks 143 that the target user account 129 is likely to perform based on a machine learning analysis of the user context data for the target user account 129, and the task execution data 147 for multiple client devices 109 utilized by the enterprise. A machine learning model 150 can determine that the particular task 143 exceeds a threshold value that indicates the task 143 is likely to be performed by the user account 129 based on historical task execution data 147 for client devices 109 and user accounts 129 associated with the enterprise.

The management service 120 can identify primary tasks 143 that are identified as long-duration tasks 143. The machine learning model 150 can identify long-duration tasks 143 that include an average task data download time that exceeds a predetermined threshold across multiple client devices 109. The machine learning model 150 can identify long-duration tasks 143 that have an average execution duration that exceeds a predetermined threshold across multiple client devices 109. In this way, the management service 120 can identify the tasks 143 that have a greatest need for preload and execution in order to optimize the user experience.

A machine learning model 150 can also output an identification of secondary tasks 143 that exceed a threshold value that indicates the secondary task 143 is likely to be performed before or after a particular (e.g., primary) task 143. In other words, a machine learning model 150 can identify a workflow that includes a primary task 143 and one or more secondary tasks 143, along with an order of execution for the workflow. The workflow can specify network services, connectors 139, and service authentication data 140 that is used to access and download task content 145 stored by the network services 106 for each task 143. The task preload schedule 149 can include the order of execution for the workflow, including task content download times and task execution times for the primary task 143 and one or more secondary tasks 143.

The management service 120 can identify primary tasks 143 and a task preload schedule 149 for a user-selected task 143. For example, the user can select a task 143 through a user interface on the client device 109, the client management component 155 can transmit the identification of this task 143 to the management service 120, and the management service 120 can generate a task preload schedule 149 that includes task content download times and task execution times for the user-selected primary task 143 and any secondary tasks 143.

The management service 120 can use the machine learning model 150 to generate or output a task preload schedule 149. The task preload schedule 149 can specify timing information for downloading task execution data 147 from the management service 120 or from a network service 106. The task preload schedule 149 can also specify a time at which a task 143 should be initiated. The task preload schedule 149 can optimize network throughput and prevent network competition for the task content 145. To this end, existing task preload schedules 149 can also be used as input parameters to the machine learning models 150 in order to distribute download times and execution times for task preload schedules 149.

An SD-WAN enabled edge device 115 can include or be connected through a local area network to a data store 161 that can store the tasks 143, task content 145, task preload schedules 149, the edge management component 165, and other data and instructions. The SD-WAN enabled edge device 115 can include an edge device 115 that prioritizes enterprise-related network traffic and optimizes this network traffic between the client device 109 and endpoints of the network services 106 and the computing environment 103. The SD-WAN enabled edge device 115 can utilize virtual network functions that prioritize and optimize enterprise-related communications. A home environment can include multiple users including enterprise employees and their family or others. However, since network resources can be limited in a home or off-premises environment, the SD-WAN enabled edge device 115 can ensure that network resources for enterprise activities are prioritized over other communications, the network path for these communications is optimized to decrease latency, increase throughput, and otherwise optimize network quality.

The client management component 155 can include an agent, application, service, process, as well as other types of instructions and software components executed by a client device 109. The client management component 155 can include instructions provided as part of a managed application such as a managed email application, a managed document viewer application, a container application. The managed application can include the client management component 155 by generating the managed application to include a management software development kit (SDK) or a portion of a management SDK provided by the management service 120. The client management component 155 can also include a management plugin for a third-party application installed on the client device 109. A management plugin can be preinstalled to a third-party application that is downloaded from the management service 120 or a network service 106. A notification can also be transmitted to the client device 109, which includes a recommendation to install the management plugin and instructions to download and install the management plugin.

The client management component 155 can monitor a component of the operating system 153 to identify tasks 143 and task execution data 147. The client management component 155 can analyze an operating system-specific class or component of the operating system 153 such as an event viewer, a resource monitor, a system monitor, a registry, or a file system class or component. For example, the client management component 155 can use a file system class of an operating system 153 to watch for changes in a specified directory, subdirectory, and specified files therein. The client management component 155 can use an events messaging service or application programming interface (API) to monitor for changes to a specified directory tree. The client management component 155 can generate and provide instructions that use the operating system component to watch for specified changes that can identify the tasks 143 and task execution data 147.

The client management component 155 can transmit the task execution data 147 to the management service 120. The management service 120 can receive task execution data 147 for multiple client devices 109. The management service 120 can use the task execution data 147 to identify tasks 143 and related task content 145 as well as a task preload schedule 149 for a particular user account 129 and client device 109. The client management component 155 can then receive instructions to download and cache the task content 145 and perform tasks 143 according to the task preload schedule 149. The client management component 155 can download and cache the task content 145 at a time specified in the task preload schedule 149 and can initiate the execution of a task 143 at another specified time. The client management component 155 can transmit notifications to a primary mobile client device 109 for the user account 129 that indicate that a task content 145 download operation, or a task 143, is initiated, in progress, or completed.

The client management component 155 can also intercept a user request to perform a task 143 or access task content 145. This enables the client management component 155 to override the standard operation of application and operating system buttons, links, and other interface elements that would normally point to a network location of the task content 145, and instead access the task content 145 locally, providing a better and faster user experience as well as more efficient network performance. A faster user experience can be achieved by diverting a network request for task content 145 to cached or preloaded task content 145 stored in the data store 151. Efficient network performance can be achieved since the management service 120 can generate a task preload schedule 149 that specified times outside of work hours and avoids times identified to have network performance below a threshold level. The client management component 155 can also perform the actions and functionalities discussed as performed by the management service 120, including analysis of task execution data 147 to the identification of tasks 143 and task preload schedules 149 using task preload models.

The client management component 155 can download and cache the task content 145 at a time specified in the task preload schedule 149 and can initiate the execution of a task 143 at another specified time. The client management component 155 can transmit notifications to a primary mobile client device 109 for the user account 129 that indicate that a task content 145 download operation, or a task 143, is initiated, in progress, or completed.

The edge management component 165 can include an agent, application, service, process, as well as other types of instructions and software components executed by an edge device 115. The edge management component 165 can be generated to include a management software development kit (SDK) or a portion of a management SDK provided by the management service 120. The edge management component 165 can also perform the actions and functionalities discussed as performed by the management service 120, including analysis of task execution data 147 to the identification of tasks 143 and task preload schedules 149 using task preload models.

The edge management component 165 of an SD-WAN enabled edge device 115 can also receive instructions to download and cache the task content 145 according to the task preload schedule 149. In the case of the edge management component 165, the task content 145 can be stored in a data store 161 of the edge device 115. While the task content 145 is not on the client device 109 in this scenario, the LAN throughput can be faster and more reliable than accessing this task content 145 over the WAN or Internet. The data store 161 can include an internal data store of the SD-WAN enabled edge device 115, or an external data store accessed over the LAN provided by the SD-WAN enabled edge device 115. The client device 109 can be connected to the same LAN provided by the SD-WAN enabled edge device 115.

The edge management component 165 can intercept network traffic or data packets for a user request to access task content 145. For example, an SD-WAN enabled edge device 115 can receive the network traffic or data packets, and the edge management component 165 can determine that the task content 145 has been downloaded and cached to a data store 161 by the SD-WAN enabled edge device 115, according to a task preload schedule 149 received from the management service 120. The edge management component 165 can then provide the client device 109 with the preloaded task content 145 over the LAN rather than over the WAN or Internet. The edge management component 165 can intercept network traffic or data packets from the client device 109 to identify task execution data 147 for the client device 109 by parsing and analyzing the headers and data of the network packets from the client device 109.

Connectors 139 can refer to services or components of the management service 120 that can fetch information that enables a user to perform an task at a network service 106, while using a client device 109. As a result, a connector 139 can be referred to as a network service connector of the management service 120. In some cases, the connectors can be provided using a virtual machine or another virtual resource. Connectors 139 can include connectors 139 hosted in the computing environment 103, or external connectors 139 hosted externally to the computing environment 103.

Connectors 139 can handle communications with the network services 106, which in some examples can be provided by third-parties relative to the provider of the e-mail application. For example, a connector 139 can fetch account-specific and task-specific information from the network services 106. Connectors 139 can be used to perform a particular task 143 using a network service 106. Connectors 139 can indicate a particular network service 106 that can be used to perform the task 143. An enterprise can have access to a number of network services 106 that can handle a particular task 143. The management service 120 can provide a user interface through which an enterprise can generate a connector 139 that associates a particular task 143 with a particular network service 106. The client management component 155 and edge management component 165 can use internal and external connectors 139 to identify task execution data 147. The client management component 155 and edge management component 165 can also use internal and external connectors 139 to download task content 145.

The management service 120 can transmit service requests, or requests associated with the network services 106, to the connectors 139. In some cases, a connector 139 is hosted in the computing environment 103, and the management service 120 can provide the connector 139 with a service request that includes service credentials. However, when a connector 139 is external to the computing environment 103, the management service 120 can transmit a service request that does not include the service credentials. The service request can include instructions to obtain service credentials from an enterprise-hosted data store external to the computing environment 103. The connector 139 can retrieve the service credentials, and fetch information from the network service 106.

The management service 120 can include an administrative console or user interface that enables a user to configure a connector 139 to fetch data from a network service 106. The user interface can include a text box or other user interface elements through which connector specifications can be entered or otherwise configured. The connector 139 can include a connector name, a public facing connector URL or connector network address, a network endpoint of the network service 106, and an authentication type for the network service 106. The authentication types can include username/password, OAUTH, SSO, and others. The management service 120 can determine whether a particular connector is a connector 139 or an external connector 139 by analyzing the connector URL. For example, the connector address can indicate that the connector is a connector 139 where the connector URL includes a reference to a localhost, or the connector address is identified as a local IP address. The connector address can indicate that the connector is an external connector 139 where the connector address is a remote IP address, the connector URL excludes references to a localhost.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system 153 can be stored in a data store 151 that also includes a client management component 155, other applications, and other data. The client device 109 can execute the client management component 155 to perform or access the functionality described for the management service 120. The client device 109 can be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine, a voice activated smart device, or a kiosk that is located in a particular location, or is not easily portable. The client device 109 can include user interface devices that can be utilized to interact with users. The user interface devices can include audio devices, display devices, and haptic devices.

The operating system 153 of the client device 109 can execute various client functionalities or client applications, such as a client management component 155, a browser application, a voice interface functionality, or another application. The operating system 153 and some applications can access network content served up by the computing environment 103, or other servers and can present this information to a user through one or more of the user interface devices. For example, the client device 109 can render a user interface on a display, such as a liquid crystal display (LCD), organic light emitting diode (OLED) display, touch-screen display, or other type of display device. The client device 109 can also present audio information using the audio device and can provide haptic or physical feedback using the haptic device.

Client applications can include a browser or a dedicated application, and a user interface can include a network page, an application screen, or other interface. The client device 109 can also access web applications using the browser application. Further, other applications can include enterprise applications, social networking applications, word processors, spreadsheet applications, media player applications, or another application. The client management component 155 can be an application that performs certain functions in concert with the management service 120. The client management component 155 can perform tasks as directed by the management service 120, for instance, by checking in with the management service 120, retrieving a command from the command queue, and implementing the command as discussed above.

Figure 2:
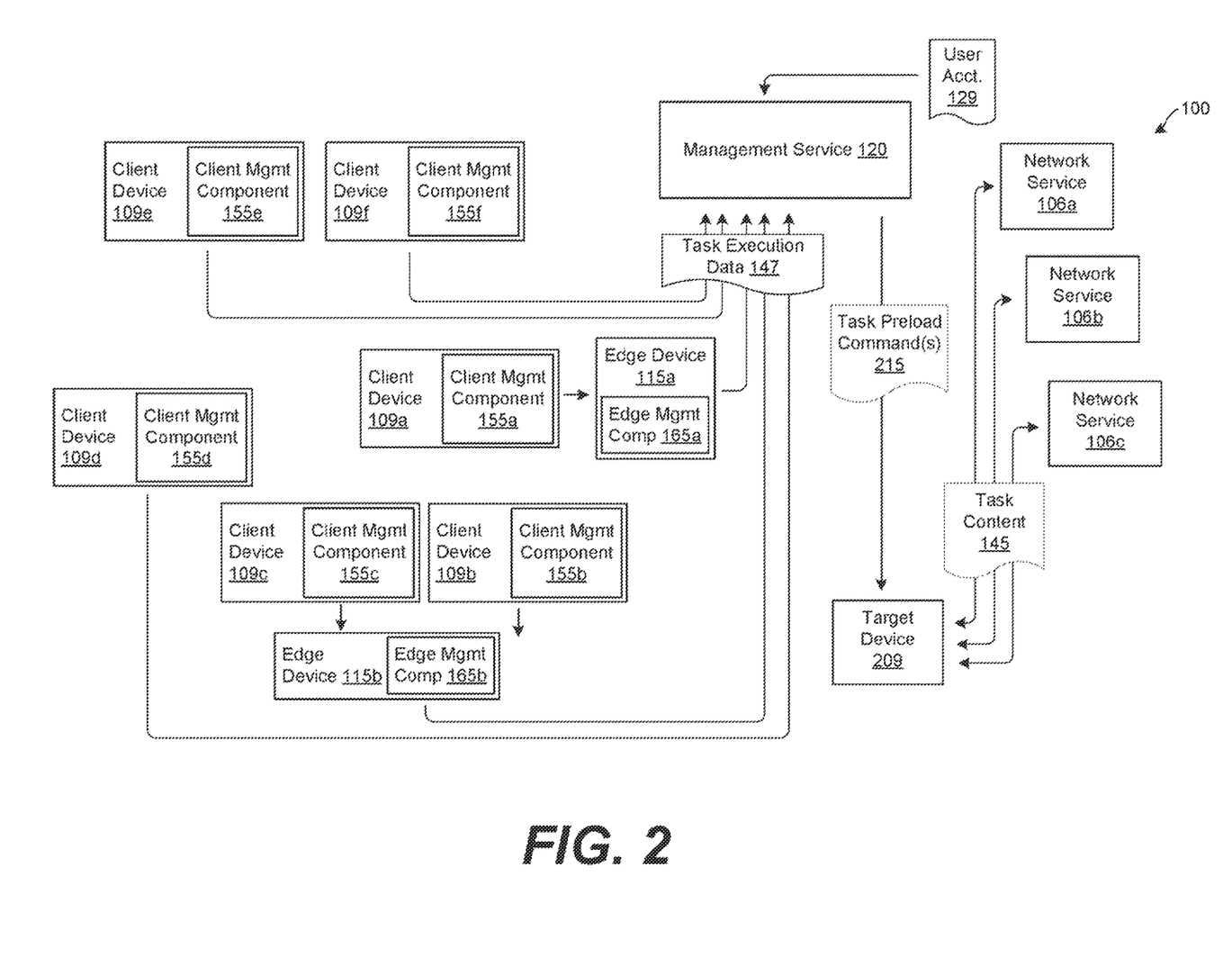
FIG. 2 is a drawing that illustrates an example of operations performed by the components of the networked environment for remote working experience optimization.

FIG. 2 shows an example of functionality of components of the networked environment 100 for remote working experience optimization. In this example, the networked environment 100 can include the management service 120, client devices 109a-109f, edge devices 115a and 115b, a target device 209, and network services 106a-106c.

Each of the client devices 109a-109f can transmit task execution data 147 to the management service 120. A client management component 155a executed on a client device 109a can monitor the client device 109a to identify tasks 143 that are executed and task execution data 147 that provides context information regarding the client device 109a, and associated characteristics of its location, network, user, execution time, duration, and other data for each task 143. A client management component 155b executed on a client device 109b can monitor the client device 109b to identify tasks 143 that are executed and task execution data 147 that provides context information regarding the client device 109b, and associated characteristics of its location, network, user, execution time, duration, and other data for each task 143. Likewise, the client device 109c can include a client management component 155c, the client device 109d can include a client management component 155d, the client device 109e can include a client management component 155e, and the client device 109f can include a client management component 155f. Each client management component 155 can monitor its associated client device 109 and provide task execution data 147 to the management service 120.

The client device 109a can include a wired or wireless network connection to a LAN provided by the edge device 115a. The client devices 109b and 109c include a wired or wireless network connection to a LAN provided by the edge device 115b. The task execution data 147 provided by the client management component 155a can indicate the client device 109 has a network connection through the edge device 115a. The task execution data 147 can also indicate whether the edge device 115a is an SD-WAN enabled edge device 115 that includes an edge management component 165a. The task execution data 147 provided by each of the client management component 155b and the client management component 155c can indicate their respective devices to connect through the edge device 115b. The task execution data 147 can also indicate whether the edge device 115b is an SD-WAN enabled edge device 115 that includes an edge management component 165b.

The management service 120 can analyze the task execution data 147 for the client devices 109 along with information for a target user account 129, providing the parameters of the task execution data 147 and the user account 129 as inputs to a machine learning model 150. The machine learning model 150 can provide an output that the management service 120 can use to generate a task preload schedule 149 and the task preload commands 215. In some cases, a task preload command 215 can include a task preload schedule 149 that identifies one or more tasks 143, task content 145, a time to download the task content 145, and a time to initiate the task 143. In other cases, the task preload command 215 for a particular action, such as downloading a particular set of task content 145 or initiating a particular task 143, is provided based on a timing indicated by the task preload schedule 149.

The management service 120 can transmit the task preload command 215 directly or can place the task preload command 215 in a command queue of the target device 209. In the various embodiments, the target device 209 can include a particular client device 109, or an edge device 115 through which the client device 109 connects to a network. A management agent executed on the target device 209 can check in with the management service 120 and retrieve the task preload command 215 from the command queue, or otherwise receive and execute the task preload command 215. The task preload command 215 can include a network location or locations to obtain specified task content 145, as well as a network location to download the task preload schedule 149.

In scenarios where the task preload schedule 149 is included, the management agent executed on the target device 209 can perform a number of actions or commands specified in the task preload schedule 149. For example, the target device 209 can retrieve task content 145 from each of the network service 106a, the network service 106b, and the network service 106c. The target device 209 can work in concert with the management service 120 to authenticate with and retrieve the task content 145 from the network services 106 using connectors 139 and service authentication data 140.

In one example, the client devices 109a-109b can receive emails or other messages using an email application or another messaging application. The messages can include task assignment messages received in a task assignment application. In some cases, a task 143 can be assigned to all user accounts 129 or user accounts 129 of a group 127. Each of the client management agents 155 can analyze the messages received on a corresponding client device 109 to identify a task 143 that is assigned through the message. For example, the task 143 can include watching a video that can be downloaded from a source URL or otherwise from a specified network location of a network service 106; opening a training document from a source URL or otherwise from a specified network location of a network service 106; executing an application that requires task content 145 from a source URL or otherwise from a specified network location of a network service 106, and so on. The client management agents 155 can identify associated task execution data 147 and transmit it to the management service 120.

The management service 120 can analyze the task execution data 147 and user context data for a target user account 129, for example, using a machine learning model 150. The user context data can indicate that a target device 209 of the target user account 129 has received a message from a particular source URL and a particular assignor. In a non-limiting example, the management service 120 can substantially identify that most users from a group 127 of the target user account 129 watch videos or perform other tasks 143 from the source URL and/or the assignor user account 129. The management service 120 can generate a task preload schedule 149 that specifies a time to download and cache the video and other task content 145. As a result, by the time the user accesses the message, the video can already be downloaded and cached on the target device 209. As a result, the management agent of the target device 209 can intercept a request to access the task content 145 that targets the network service 106 or a URL, and can instead provide access to the cached version of the task content 145 stored on the target device 209.

In the example where the target device 209 is the client device 109a, a user can select the link or URL from a message or a user interface element in an application to initiate a task 143 or otherwise access the task content 145. A client management component 155a can check a local client device 109a for the task content 145 before passing the task content request through to the original source URL. The client management component 155a or another process used by the management agent can act as a reverse proxy. If a cached version the task content 145 is located, the client management component 155a returns it. If not, the client management component 155a can pass the task content request connection to the original source.

In the example where the target device 209 is the SD-WAN enabled edge device 115a, the client device 109a connects through the edge device 115a. The client management component 155a can pass a task content request to the original source of the task content 145. The packets comprising the request can be transmitted through the SD-WAN enabled edge device 115a. The edge management component 165a can check a data store 161 of the edge device 115a for the task content 145 before passing the task content request through to the original source URL. The edge management component 165a can act as a reverse proxy and can use virtual network functions or other functions to check the data store 161 of the edge device 115a for the task content 145 before passing the task content request through to the original source URL. If a cached version the task content 145 is located, the edge management component 165a transmits it to the client device 109a over the LAN. If not, the edge management component 165a can pass the connection to the original source.

Figure 3:
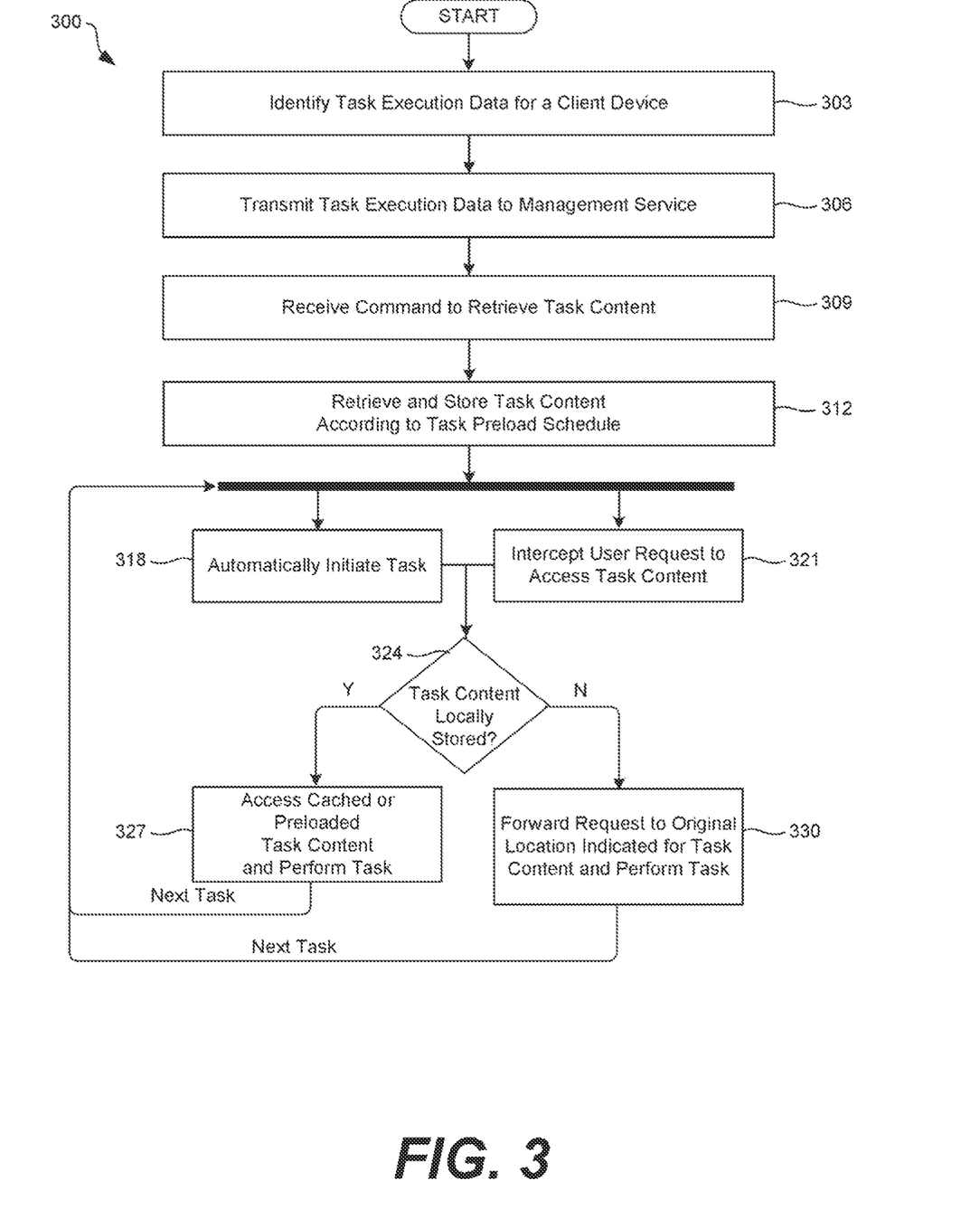
FIG. 3 is a flowchart outlining functionalities implemented by components of the networked environment to provide remote working experience optimization.

FIG. 3 shows a flowchart 300 outlining functionalities implemented by components of the networked environment to provide remote working experience optimization. Generally, the flowchart 300 describes functionalities performed by a management agent such as the client management component 155 and the edge management component 165. While the flowchart 300 is described as being performed by the client management component 155, the edge management component 165 can also perform these actions and steps. Additional functionalities discussed can be performed by the management service 120, the network services 106, and other components of the networked environment 100.

In step 303, the client management component 155 can identify task execution data 147 for a client device 109. The client management component 155 can be executed by the client device 109. The task execution data 147 can be identified by monitoring an operating system 153 component such as a class, event notification service, event log, registry. This can include transmitting or otherwise generating and providing console commands and other electronic commands and requests to the operating system 153 component.

In step 306, the client management component 155 can transmit task execution data 147 to the management service 120. The management service 120 can use the task execution data 147 from multiple client devices 109, and user context data for a target user account 129 to generate a task preload schedule 149. The task execution data 147 can include a current set of task preload schedules 149. This information describes tasks 143 that are scheduled to be performed at future times. The management service 120 can use all of this information to provide input parameters into a machine learning model 150. The management service 120 can use one or more output parameters to generate a task preload schedule 149. The task preload schedule 149 can include task content download times and task execution times for a primary task 143 and one or more secondary tasks 143.

In step 309, the client management component 155 can receive a command to retrieve task content 145. The management service 120 can place the command to retrieve task content 145 in a command queue at a time identified using the task preload schedule 149. As a result, the client management component 155 can retrieve and execute the command at the time specified according to the task preload schedule 149. However, in other cases, the task preload schedule 149 itself can be transmitted to the client management component 155. The task preload schedule 149 can include a command to retrieve task content 145 at a specified time.

In step 312, the client management component 155 can retrieve and store task content 145 according to the task preload schedule 149. The client management component 155 can retrieve task content 145 from the management service 120 or from the network service 106. The network services 106 can include an enterprise server or a management service server, as well as third party servers. The client management component 155 can use a connector 139 of the management service 120 to retrieve task content 145 from a network service 106. The client management component 155 can download and cache or otherwise store the task content 145 locally.

In step 318, the client management component 155 can automatically initiate a task 143 according to the task preload schedule 149. The task 143 can include a long running task 143 such as deploying a containerized cluster or another type of task that can be initiated and executed for a long period of time. In some cases, the timing can be selected so that the task 143 is initiated and/or completed prior to a work start time associated with a target user account 129. The task 143 can be executed on the client device 109, which can be a main productivity device such as a laptop or desktop computer enrolled with the management service 120 in association with the target user account 129. The client management component 155 can transmit a notification to a primary mobile device enrolled with the management service 120 in association with the target user account 129. The notification can indicate initiation of a task 143, completion of a task 143, estimated duration or remaining duration of the task 143, initiation of a task content download, completion of a task content download, task ready, and other progress notifications associated with the task 143 or a task preload schedule 149.

In step 321, the client management component 155 can intercept a user request to access task content 145. This enables the client management component 155 to override the standard operation of application and operating system buttons, links, and other interface elements that would normally point to or access a network location of the task content 145. A user can select the link or URL from a message or a user interface element in an application to initiate a task 143 or otherwise access the task content 145. The client management component 155 can detect the user selection of the user interface element or detect a resulting request for task content 145.

In step 324, the client management component 155 can check a local client device 109 for the task content 145. If the client management component 155 locates a cached version of the task content 145, the process can move to step 327. If not, the process can move to step 330.

In step 327, the client management component 155 can access the cached or preloaded task content 145 and provide it to perform the task 143. For example, the client management component 155 can locate a cached version of the task content 145 and return it to instructions comprising the task 143. For example, a locally cached or stored version of a video file can be provided to a video player application for a task 143 that includes watching a video. A locally cached or stored version of a data set for a containerized application can be provided for a task 143 that includes deploying a containerized cluster and executing the containerized application.

In step 330, if a cached version of the task content 145 is not located, then the client management component 155 can forward a request for the task content 145 to the original location indicated for the task content 145.

Figure 4:
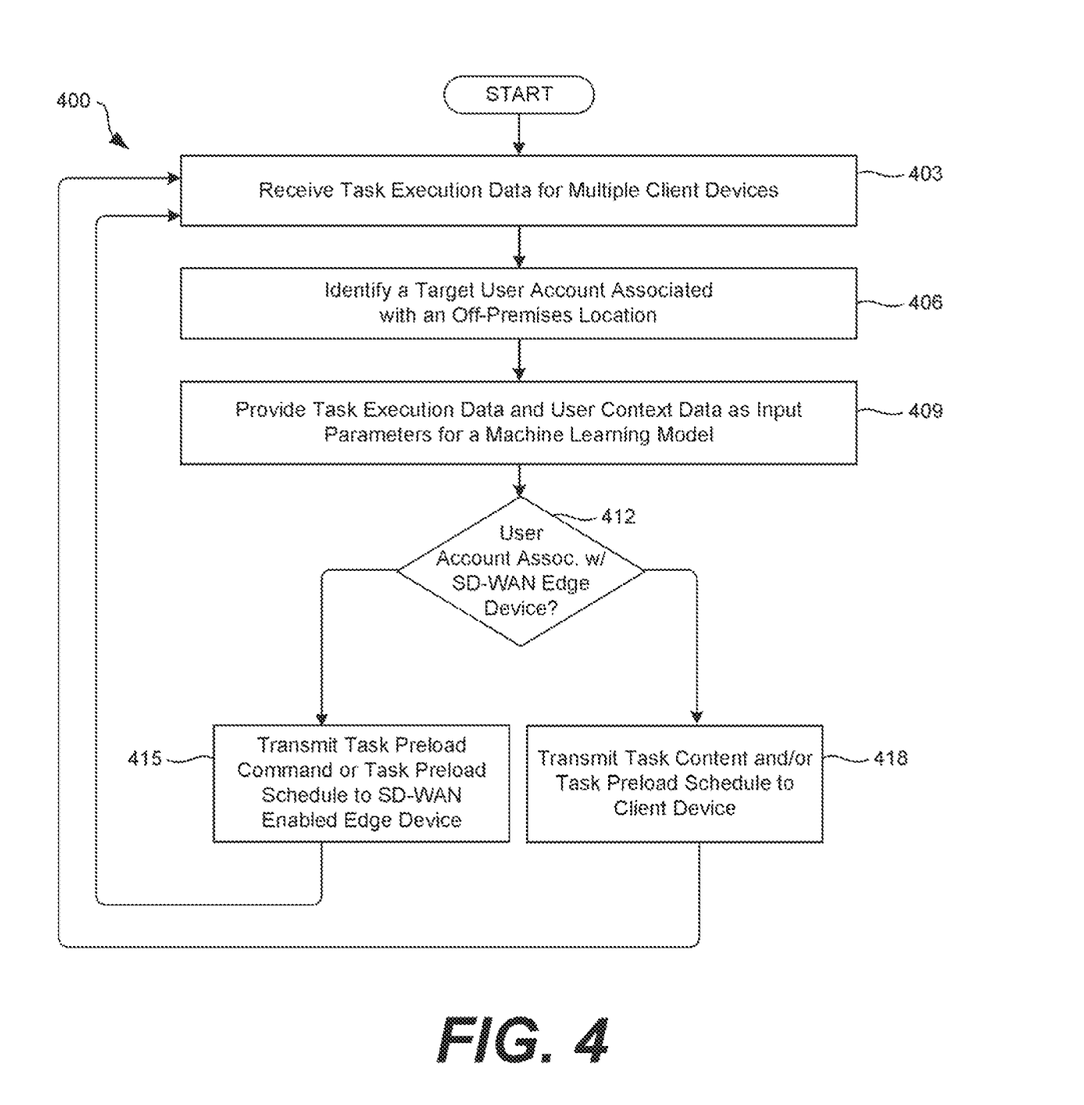
FIG. 4 is another flowchart outlining functionalities implemented by components of the networked environment to provide remote working experience optimization.

FIG. 4 shows a flowchart 400 outlining functionalities implemented by components of the networked environment 100 to provide remote working experience optimization. Generally, the flowchart 400 describes functionalities performed by a management service 120. While the flowchart 400 is described as being performed by the client management component 155, additional functionalities discussed can be performed by the edge management component 165, the client management component 155, the network services 106, and other components of the networked environment 100.

In step 403, the management service 120 can receive and monitor task execution data 147 for multiple client devices 109. The task execution data 147 can include an identification of the tasks 143 performed by client devices 109, as well as execution context of each task 143 that can include user context data of associated user accounts 129. The task execution data 147 can indicate a start time, an end time, and a duration for a task 143 and associated task content downloads. The task execution data 147 can indicate a measure of network quality as well as network bandwidth and actual network throughput. The network quality can be reported for task execution and task content 145 downloads. The task execution data 147 can specify an enterprise role such as a position or title within the enterprise as well as a group 127. The task execution data 147 can indicate whether a particular task 143 is executed in an off-premises environment or on-premises, and a geolocation associated with each task 143. The task execution data 147 can specify a configuration of an operating system 153, including an operating system type, version, and settings. A hardware configuration of the client device 109 can also be specified. The task execution data 147 can specify an edge device 115 through which the client device 109 connects to the network 112, as well as an indication of whether the edge device 115 is an SD-WAN enabled edge device 115.

In step 406, the management service 120 can identify a target user account 129. In some examples, the target user account 129 can be identified as a user account 129 associated with an off-premises location. This can enable the management service 120 to optimize the user experience for a remotely working user associated with the user account 129. The management service 120 can further identify a number of user context data parameters associated with the user account 129.

The user context data can include a configuration of an operating system 153 of a client device 109 associated with the account. The operating system configuration can include an operating system type, version, and settings. The user context data can indicate a geolocation of the client device 109 and a measure of network quality as well as network bandwidth and actual network throughput for the client device 109. The user context data can indicate whether the associated client device 109 is generally located in an off-premises environment or on-premises for enterprise-related tasks 143. In some cases, the type of off-premises environment can be indicated. The user context data can also indicate a group 127, subgroup, and a group-related role, such as a position or title with the enterprise. The user context data can also include information identified by the management service 120 from analysis of enterprise communications through a task application, email application, or messenger application.

In step 409, the management service 120 can provide the task execution data 147 and user context data for the target user account 129 as input parameters for a machine learning model 150. In other words, the management service 120 can use the task execution data 147 from multiple client devices 109, and user context data for a target user account 129, to generate a task preload schedule 149. The task execution data 147 can include a current or previously generated set of task preload schedules 149. This information describes tasks 149 that are scheduled to be performed at future times. The management service 120 can use all of this information to provide input parameters into a machine learning model 150. The management service 120 can use one or more output parameters to generate a task preload schedule 149. The task preload schedule 149 can include task content download times and task execution times for a primary task 143 and one or more secondary tasks 143.

In step 412, the management service 120 can determine whether the target user account 129 is associated with an SD-WAN enabled edge device 115. For example, if a productivity client device 109, such as a laptop or desktop client device 109 of the target user account 129 is identified to connect through an SD-WAN enabled edge device 115, the process can move to step 415. Otherwise, if a productivity client device 109 of the target user account 129 does not connect through an SD-WAN enabled edge device 115, the process can move to step 418.

In step 415, the management service 120 can transmit a task preload command or task preload schedule 149 to an SD-WAN enabled edge device 115. The task preload command 215 can include a task preload schedule 149 that identifies one or more tasks 143, task content 145, a time to download the task content 145, and a time to initiate the task 143. Alternatively, the task preload command 215 for a particular action, such as downloading a particular set of task content 145 or initiating a particular task 143, is provided based on a timing indicated by the task preload schedule 149.

The management service 120 can transmit the task preload command 215 directly or can place the task preload command 215 in a command queue of the SD-WAN enabled edge device 115. The edge management component 165 can check in with the management service 120 and retrieve the task preload command 215 from the command queue, or otherwise receive and execute the task preload command 215. The task preload command 215 can include a network location or locations to obtain specified task content 145, as well as a network location to download the task preload schedule 149.

While the task content 145 is not on the client device 109 in this scenario, the LAN throughput can be faster and more reliable than accessing this task content 145 over the WAN or Internet. The data store 161 can include an internal data store of the SD-WAN enabled edge device 115, or an external data store accessed over the LAN provided by the SD-WAN enabled edge device 115. The client device 109 can be connected to the same LAN provided by the SD-WAN enabled edge device 115.

In step 418, the management service 120 can transmit a task preload command or task preload schedule 149 to a client device 109. The task preload command 215 can include a task preload schedule 149 that identifies one or more tasks 143, task content 145, a time to download the task content 145, and a time to initiate the task 143. Alternatively, the task preload command 215 for a particular action, such as downloading a particular set of task content 145 or initiating a particular task 143, is provided based on a timing indicated by the task preload schedule 149.

The management service 120 can transmit the task preload command 215 directly or can place the task preload command 215 in a command queue of the client device 109. The client management component 155 can check in with the management service 120 and retrieve the task preload command 215 from the command queue, or otherwise receive and execute the task preload command 215. The task preload command 215 can include a network location or locations to obtain specified task content 145, as well as a network location to download the task preload schedule 149.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by management service 120, client management component 155, or another application can be rendered. In some examples, the user interface can be generated with user interface data provided by the computing environment 103. The client devices 109 can also include one or more input/output devices that can include, for example, a capacitive touchscreen or other type of touch input device, fingerprint reader, or keyboard.

Although the various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system for managing a plurality of client devices through a management component running in each of the client devices, the system comprising:
   at least one computing device comprising at least one processor; and
   at least one memory comprising machine-readable instructions, wherein the instructions, when executed by the at least one processor, cause the at least one computing device to at least:
   acquire historical task execution data from the plurality of client devices respectively through the management components running in the plurality of client devices, the historical task execution data including an identification of a plurality of tasks that have been performed by the client devices and execution context of each of the tasks, the execution context of each of the tasks including a time when task content corresponding to the task has been downloaded, a duration that has been taken to download the task content, and an actual network throughput of downloading the task content;
   train a machine learning model over a period of time with the historical task execution data from the plurality of client devices and user context data associated with user accounts for the plurality of client devices, the user context data associated with each of the user accounts indicating a configuration of an operating system of a client device associated with the user account, whether the client device associated with the user account is in an off-premise or on-premise environment, and an enterprise role of a user associated with the user account,
   wherein the machine learning model is trained to be able to generate, in response to an input of user context data associated with a user account, a task preload schedule for the user account that identifies one or more tasks for the user account and indicates a time to download and cache task content for the one or more tasks for the user account;
   retrieve target user context data associated with a target user account from a storage device, in which user context data associated with a user account for each of the client devices are stored;
   input the target user context data into the machine learning model to generate a task preload schedule for the target user account that identifies at least one task for the target user account and indicates a time to download and cache task content for the at least one task for the target user account; and
   transmit, to a management agent instructions or the management agent to download and cache the task content for the at least one task for the target user account according to the task preload schedule for the target user account,
   wherein the task preload schedule for the target user account identifies:
   as a primary task, a long-duration task that experiences an average task data download time exceeding a predetermined threshold;
   as a secondary task, a task that is likely to be performed before or after the primary task; and
   a workflow with an order of execution of the primary task and the secondary task.

2. The system of claim 1, wherein the target user account is identified based on an indication that the target user account is associated with off-premises usage.

3. The system of claim 1, wherein the management agent is executed by the client device, and the management agent downloads and caches the task content to a data store of the client device.

4. The system of claim 1, wherein the instructions, when executed by the at least one processor, cause the at least one computing device to at least:
   identify an edge device through which a client device connects to a network, wherein the management agent is executed by the edge device, and the management agent downloads and caches the task content to a data store of the edge device.

5. The system of claim 1, wherein the execution context of each of the tasks further includes at least one of: a task type and a task source.

6. A non-transitory computer-readable medium comprising machine-readable instructions, wherein the instructions, when executed by at least one processor of a computing device of a device management system that manages a plurality of client devices through a management component running in each of the client devices, cause the computing device to at least:
   acquire historical task execution data from the plurality of client devices respectively through the management components running in the plurality of client devices, the historical task execution data including an identification of a plurality of tasks that have been performed by the client devices and execution context of each of the tasks, the execution context of each of the tasks including a time when task content corresponding to the task has been downloaded, a duration that has been taken to download the task content, and an actual network throughput of downloading the task content;
   train a machine learning model over a period of time with the historical task execution data from the plurality of client devices and user context data associated with user accounts for the plurality of client devices, the user context data associated with each of the user accounts indicating a configuration of an operating system of a client device associated with the user account, whether the client device associated with the user account is in an off-premise or on-premise environment, and an enterprise role of a user associated with the user account,
    wherein the machine learning model is trained to be able to generate, in response to an input of user context data associated with a user account, a task preload schedule for the user account that identifies one or more tasks for the user account and indicates a time to download and cache task content for the one or more tasks for the user account;
retrieve target user context data associated with a target user account from a storage device, in which user context data associated with a user account for each of the client devices are stored;
input the target user context data into the machine learning model to generate a task preload schedule for the target user account that identifies at least one task for the target user account and indicates a time to download and cache task content for the at least one task for the target user account; and
transmit, to a management agent executed by a client device associated with the target user account, instructions for the management agent to download and cache the task content for the at least one task for the target user account according to the task preload schedule for the target user account,
wherein the task preload schedule for the target user account identifies:
as a primary task, a long-duration task that experiences an average task data download time exceeding a predetermined threshold; and
as a secondary task, a task that is likely to be performed before or after the primary task; and
a workflow with an order of execution of the primary task and the secondary task.

7. The non-transitory computer-readable medium of claim 6, wherein the target user account is identified based on an indication that the target user account is associated with off-premises usage.

8. The non-transitory computer-readable medium of claim 6, wherein the management agent is executed by the client device, and the management agent downloads and caches the task content to a data store of the client device.

9. The non-transitory computer-readable medium of claim 6, wherein the instructions, when executed by the at least one processor, cause the at least one computing device to at least:
    identify an edge device through which the client device connects to a network, wherein the management agent is executed by the edge device, and the management agent downloads and caches the task content to a data store of the edge device.

10. The non-transitory computer-readable medium of claim 6, wherein the execution context of each of the tasks further includes at least one of: a task type and a task source.

11. A method implemented by at least one computing device of a device management system that manages a plurality of client devices through a management component running in each of the client devices, the method comprising:
    acquiring historical task execution data from the plurality of client devices respectively through the management components running in the plurality of client devices, the historical task execution data including an identification of a plurality of tasks that have been performed by the client devices and execution context of each of the tasks, the execution context of each of the tasks including a time when task content corresponding to the task has been downloaded, a duration that has been taken to download the task content, and an actual network throughput of downloading the task content;
    training a machine learning model over a period of time with the historical task execution data from the plurality of client devices and user context data associated with user accounts for the plurality of client devices, the user context data associated with each of the user accounts indicating a configuration of an operating system of a client device associated with the user account, whether the client device associated with the user account is in an off-premise or on-premise environment, and an enterprise role of a user associated with the user account,
        wherein the machine learning model is trained to be able to generate, in response to an input of user context data associated with a user account, a task preload schedule for the user account that identifies one or more tasks for the user account and indicates a time to download and cache task content for the one or more tasks for the user account;
    retrieving target user context data associated with a target user account from a storage device, in which user context data associated with a user account for each of the client devices are stored;
    inputting the target user context data into the machine learning model to generate a task preload schedule for the target user account that identifies at least one task for the target user account and indicates a time to download and cache task content for the at least one task for the target user account; and
    transmitting, to a management agent executed by a client device associated with the target user account, instructions for the management agent to download and cache the task content for the at least one task for the target user account according to the task preload schedule for the target user account,
    wherein the task preload schedule for the target user account identifies:
    as a primary task, a long-duration task that experiences an average task data download time exceeding a predetermined threshold; and
    as a secondary task, a task that is likely to be performed before or after the primary task; and
    a workflow with an order of execution of the primary task and the secondary task.

12. The method of claim 11, wherein the target user account is identified based on an indication that the target user account is associated with off-premises usage.

13. The method of claim 11, wherein the management agent is executed by the client device, and the management agent downloads and caches the task content to a data store of the client device.

14. The method of claim 11, further comprising:
    identifying an edge device through which a client device connects to a network, wherein the management agent is executed by the edge device, and the management agent downloads and caches the task content to a data store of the edge device.

* * * * *